United States Patent [19]

Muang

[11] Patent Number: 5,753,170
[45] Date of Patent: May 19, 1998

[54] MANUFACTURING PROCESS AND STRUCTURE OF A GOLF CLUB HEAD

[76] Inventor: Mui Ming Muang, No. 528, Yow Chang Street, Kaohsiung, Taiwan

[21] Appl. No.: 717,331

[22] Filed: Sep. 20, 1996

[51] Int. Cl.$^6$ .................... B29C 39/10; B22D 19/00
[52] U.S. Cl. .................. 264/275; 264/274; 264/271.1; 264/259; 164/112; 164/98; 473/345
[58] Field of Search .................. 473/345, 346, 473/349, 350, 324; 164/98, 111, 112; 264/239, 241, 259, 271.1, 274, 275

[56] References Cited

U.S. PATENT DOCUMENTS

| | | | |
|---|---|---|---|
| 1,673,973 | 6/1928 | Drevitson | 473/345 |
| 4,558,505 | 12/1985 | Moore | 164/98 X |
| 5,261,478 | 11/1993 | Sun | 473/346 X |
| 5,262,118 | 11/1993 | Fukushima et al. | 473/345 X |
| 5,301,941 | 4/1994 | Allen | 473/327 |
| 5,398,746 | 3/1995 | Igarashi | 164/98 |
| 5,564,994 | 10/1996 | Chang | 473/346 X |
| 5,595,234 | 1/1997 | Beck | 164/98 X |

*Primary Examiner*—Raleigh W. Chiu
*Attorney, Agent, or Firm*—David & Raymond; Raymond Y. Chan

[57] ABSTRACT

A manufacturing process of a golf club head includes the following steps: (a) Construct a hollow golf club head frame which at least two opposite supporting pins protruding outwardly from an outer perimeter thereof. (b) Position the hollow golf club head frame within a precision mold which has an internal molding cavity, wherein the internal molding cavity of the mold has at least two opposite pin slots to fittingly receive the two respective supporting pins of the hollow golf club head frame for defining an uniform intermediate gap between the outer perimeter of the hollow golf club head frame and an inner wall of the mold. (c) Fill out the intermediate gap between the mold and the hollow golf club head frame with a melted metal or alloy in order to form a rigid outer shell to uniformly conceal the hollow golf club head frame. (d) Remove the mold after the outer shell and the hollow golf club head frame becomes an integral unit of golf club head, wherein each supporting pin has a residual tail protruded from the outer shell. (e) Grind the two residual tails of the supporting pins to achieve a smooth outermost surface for the golf club head. The golf club head manufactured by the above manufacturing process can provide a lighter body weight, high impact vibration resistant and durable single unit.

16 Claims, 6 Drawing Sheets

MANUFACTURING PROCESS AND STRUCTURE OF A GOLF CLUB HEAD

BACKGROUND OF THE PRESENT INVENTION

The present invention relates to a manufacturing process and structure of a golf club head, and more particularly to a manufacturing process of a golf club head which has a hollow golf club head frame having an inner cavity therein and at least two supporting pins protruding outwardly therefrom, in which the hollow golf club head frame is concealed with a metal or alloy outer shell to provide an overall high tech and rigid integral golf club head for performance golfing.

Due to the popularity of golfing in our society today, the number of golfers are growing at a massive rate. Just over the last few years, the manufacturing industries of golfing equipment are shifting into a high gear to reach the demand of consumers all around the world, yet not only massive volume of golfing products are being manufactured and distributed, but now the consumers also have an high expectation concerning the quality and performance of all the existing golfing products due to the capability of our high technology skill.

Today, there are numerous amount of golfing equipment existing out in the market. Focusing on the category under all the golf clubs alone, ratings of all the golf clubs are determined by its durability, rigidity, structure, design, and etc. All the ratings are tested through time not only by the manufacturers but also by all the consumers. The consumers will automatically make their choices on their favorites through time period. Most golf clubs out in the market today have their structure similarity, especially all the golf club heads are constructed of at least two or more pieces by die casting, forging or molding. As we all know the more pieces it takes to build a structure, the less rigid and durable it would be, and for a golfing iron, rigidity will provide a better life span for the iron.

Moreover, imagine having a golfing iron with a single unit golf club head, which will provide a long lasting and durable life span, and on top of that also having a hollow center for high impact vibrating resistant and highly lighter in weight. No doubt this idea can help us save money on frequent purchase of expensive new golfing iron, but yet can help improve golfing performances.

SUMMARY OF THE PRESENT INVENTION

The main object of the present invention is to provide a manufacturing process and structure of a golf club head, in which a golf club head having a hollow golf club head frame with supporting pins securing and holding a rigid full metal outer shell to provide a lighter body weight, high impact vibration resistant and durable single unit.

Another object of the present invention is to provide a manufacturing process and structure of a golf club head which can provide a long life span due to the rigidity and durability single unit construction.

Another object of the present invention is to provide a manufacturing process and structure of a golf club head which can provide a high impact vibration resistant.

Another object of the present invention is to provide a manufacturing process and structure of a golf club head which can provide a light weight.

Accordingly, a manufacturing process and structure of a golf club head of the present invention includes the following steps:

(a) Construct a hollow golf club head frame which has an inner cavity therein and at least two opposite supporting pins protruding outwardly from an outer perimeter of the hollow golf club head frame.

(b) Position the hollow golf club head frame within a precision mold which has an internal molding cavity having a similar shape as the hollow golf club head frame and a size larger than the hollow golf club head frame, wherein the internal molding cavity of the mold has at least two opposite pin slots to receive the two respective supporting pins of the hollow golf club head frame, so as to support the hollow golf club head frame concentrically within the mold, for defining an uniform intermediate gap between the outer perimeter of the hollow golf club head frame and an inner wall of the mold.

(c) Fill out the intermediate gap between the mold and the hollow golf club head frame with a melted metal or alloy in order to form a rigid outer shell to uniformly conceal the hollow golf club head frame, wherein the outer shell is further secured and held in position by the two supporting pins.

(d) Remove the mold after the metal or alloy outer shell and the hollow golf club head frame becomes an integral unit of golf club head, wherein each supporting pin has a residual tail protruded from the outer shell.

(e) Grind the two residual tails of the supporting pins to achieve a smooth outermost surface for the golf club head.

The golf club head manufactured by the above manufacturing process comprises a metal or alloy outer shell and a hollow center golf club frame integrally and uniformly concealed by the outer shell, in which the hollow golf club head frame has at least two supporting pins protruded from an outer perimeter of the golf club head frame to secure with the outer shell for holding the outer shell firmly and integrally with the hollow golf club head frame.

DETAILED DESCRIPTION OF THE PREFERRED EMBODIMENT

Figure 1:
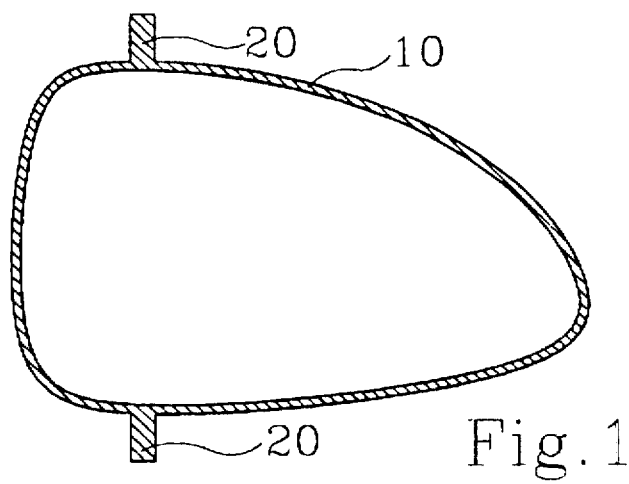
FIG. 1 is a sectional view of a hollow golf club head frame of a first preferred embodiment according to the present invention.

Referring to FIGS. 1 to 8, a manufacturing process and structure of a golf club head of the present invention includes the following steps:

(a) As shown in FIG. 1, construct a hollow golf club head frame 10 which has an inner cavity therein and at least two opposite supporting pins 20 protruding outwardly from an outer perimeter of the hollow golf club head frame 10.

Figure 2:
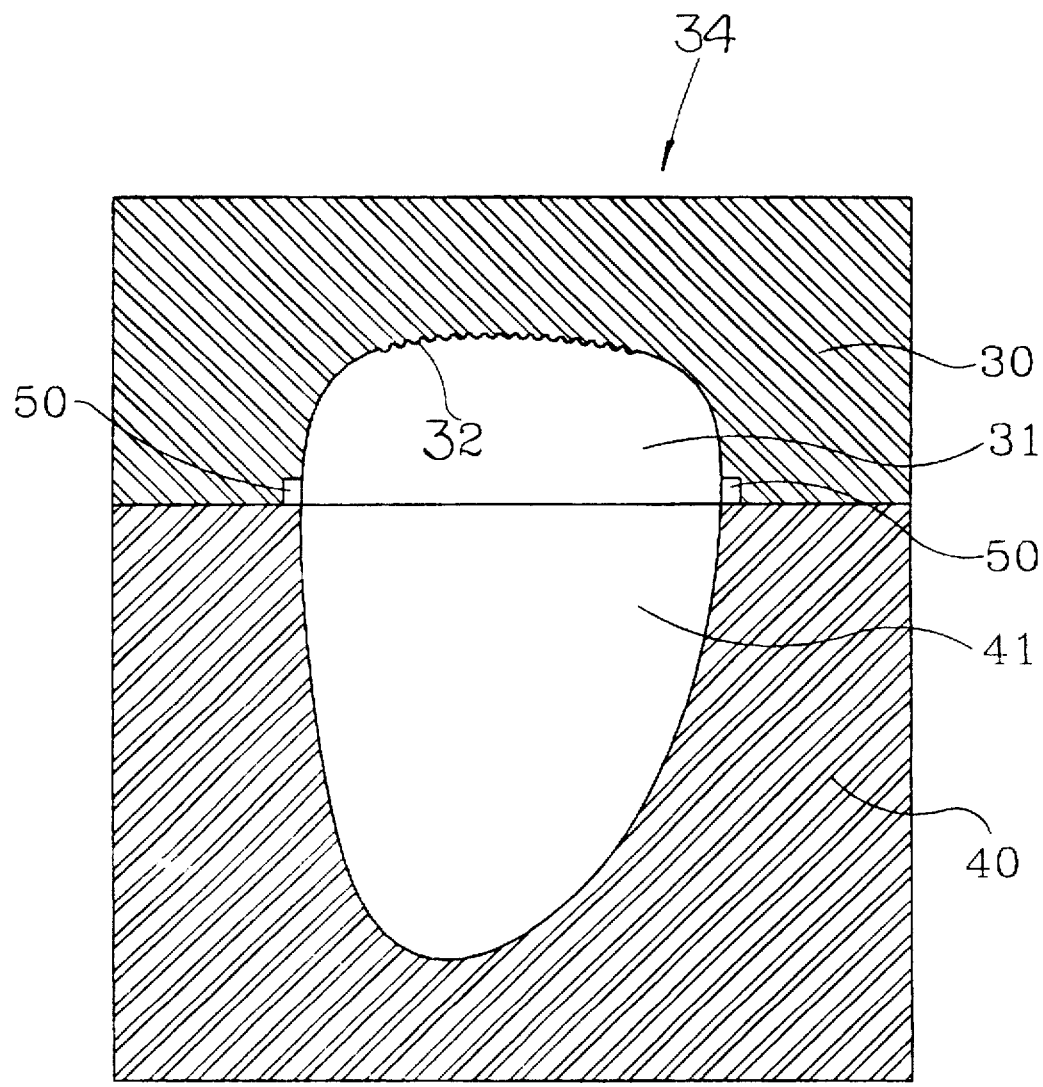
FIG. 2 is a sectional view of a first embodied mold of the above first preferred embodiment according to the present invention.
Figure 3:
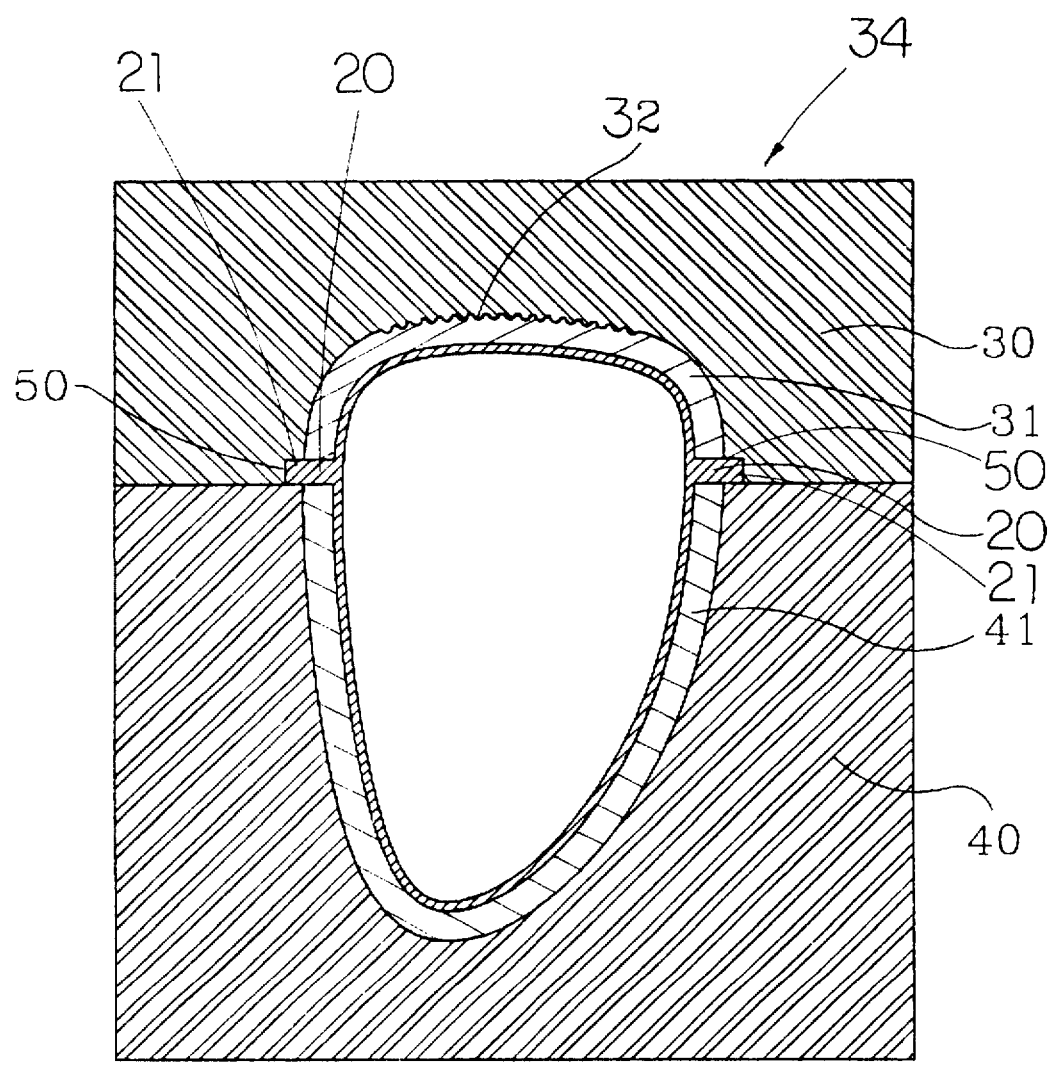
FIG. 3 is a sectional view of a hollow golf club head frame positioned within the inner cavity of the first embodied mold of the above first preferred embodiment according to the present invention.

(b) Position the hollow golf club head frame 10 within a precision mold 34 which has an internal molding cavity 31 and 41 having a similar shape as the hollow golf club head frame 10 and a size larger than the hollow golf club head frame, as shown in FIG. 2, wherein the internal molding cavity 31 and 41 of the mold 34 has at least two opposite pin slots 50 to receive the two respective supporting pins 20 of the hollow golf club head frame 10, so as to support the hollow golf club head frame 10 concentrically within the mold 30, for defining an uniform intermediate gap between the outer perimeter of the hollow golf club head frame and an inner wall of the mold 30, as shown in FIG. 3.

(c) Fill out the intermediate gap between the hollow golf club head frame 10 and the inner wall of the molding cavity 31 and 41 of the mold 34 with a melted metal or alloy in order to form a rigid outer shell 70 to uniformly conceal the hollow golf club head frame 10, wherein the outer shell 70 is further secured and held in position by the two supporting pins 20.

(d) Remove the mold 34 after the metal or alloy outer shell 70 and the hollow golf club head frame 10 becomes an integral unit of golf club head, wherein each supporting pin 20 has a residual tail 21 protruded from the outer shell 70.

Figure 8:
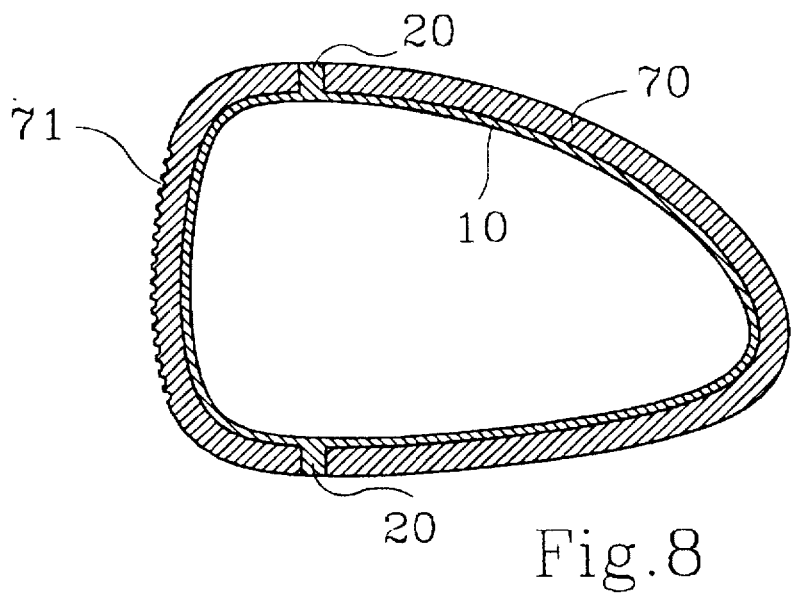
FIG. 8 is a sectional view of the alternative mode of hollow golf club head frame concealed by a metal outer shell of the above first preferred embodiment according to the present invention.

(e) Grind the two residual tails 21 of the supporting pins 20 to achieve a smooth outermost surface for the golf club head, as shown in FIG. 8.

Please referring to the above step (c) in which the melted metal or alloy filling can be replaced by an industry plastic injecting into the mold 34 to construct the outer shell 70.

Referring to FIG. 1, according to the first embodiment of the present invention, the two supporting pins 20 are protruded from two opposite and symmetrical sides, near a larger striking end, of the hollow golf club head frame 10.

As shown in FIG. 2, please referring to the above step (b) of the manufacturing process, in which a first embodied precision mold 34 comprises a first mold 30 having a first molding cavity 31 and a second mold 40 having a second molding cavity 41. When the first mold 30 and the second mold 40 engage face to face, a bottom surface of the first mold 30 and a top surface of the second mold 40 form a molding separation line. The first mold 30 has a precision cut out forming the first molding cavity 31, wherein the inner wall of the first mold 30 provides a series of scoring lines 32. The two pin slots 50 are punctured facing one another at a most outer edge of the first molding cavity 31. The second mold 40 also has a cut out forming the second molding cavity 41. When the second mold 40 encloses to interlock with the first mold 30, the two pin slots 50 would also be tightly concealed.

As shown in FIG. 3 and referring to the above step (b), the hollow golf club head frame 10 is positioned within the internal molding cavity 31 and 41 of the first and second molds 30 and 40, in which the two supporting pins 20 of the hollow golf club head frame 10 are fittingly engaging into the two pin slots 50 respectively to rigidly hold the hollow golf club head frame 10 in position within the internal molding cavity 31 and 41 of the first and second molds 30 and 40.

When the hollow golf club head frame 10 is positioned within the first and the second molds 30 and 40, there will be a gap provided uniformly between the hollow golf club head frame 10 and the inner wall of the first and the second mold 30 and 40 for the melted metal, alloy or industry plastic fillings.

Figure 4:
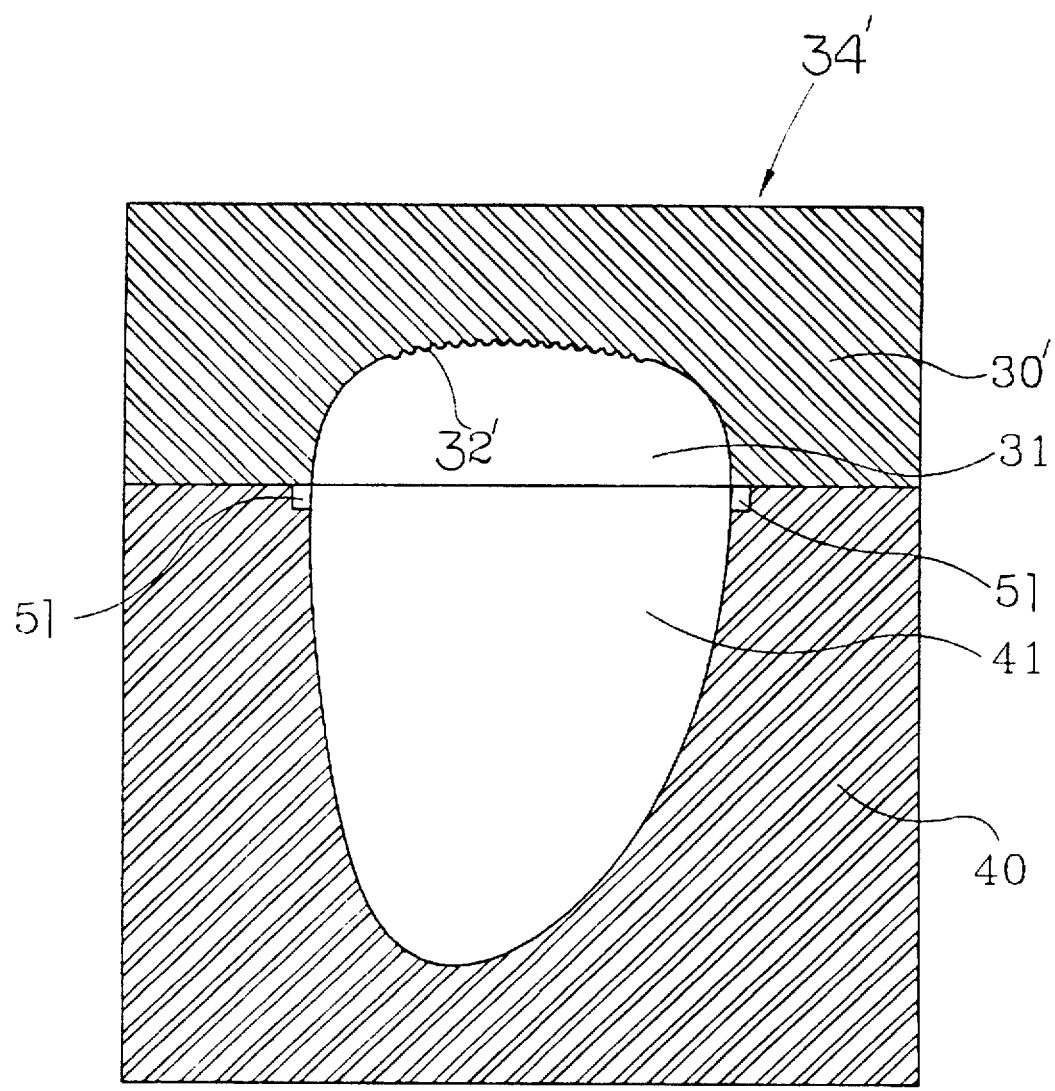
FIG. 4 is a sectional view of a second embodied mold of the above first preferred embodiment according to the present invention.

As shown in FIG. 4, a second embodied precision mold 34' is illustrated. The mold 34' also comprises a first mold 30 and a second mold 40, in which the first mold 30 and the second mold 40 engage to provide a molding separation line. The first mold 30 has a precision cut out forming a first molding cavity 31, wherein the inner wall of the first mold 30 has a series of scoring lines 32. The second mold 40 has a cut out forming a second molding cavity 41, wherein two pin slots 50' are punctured facing one another at a most outer edges of the second molding cavity 41. When the second mold 40 encloses to interlock with first mold 30, the two pin slots 50 would also be tightly concealed as one.

Figure 5:
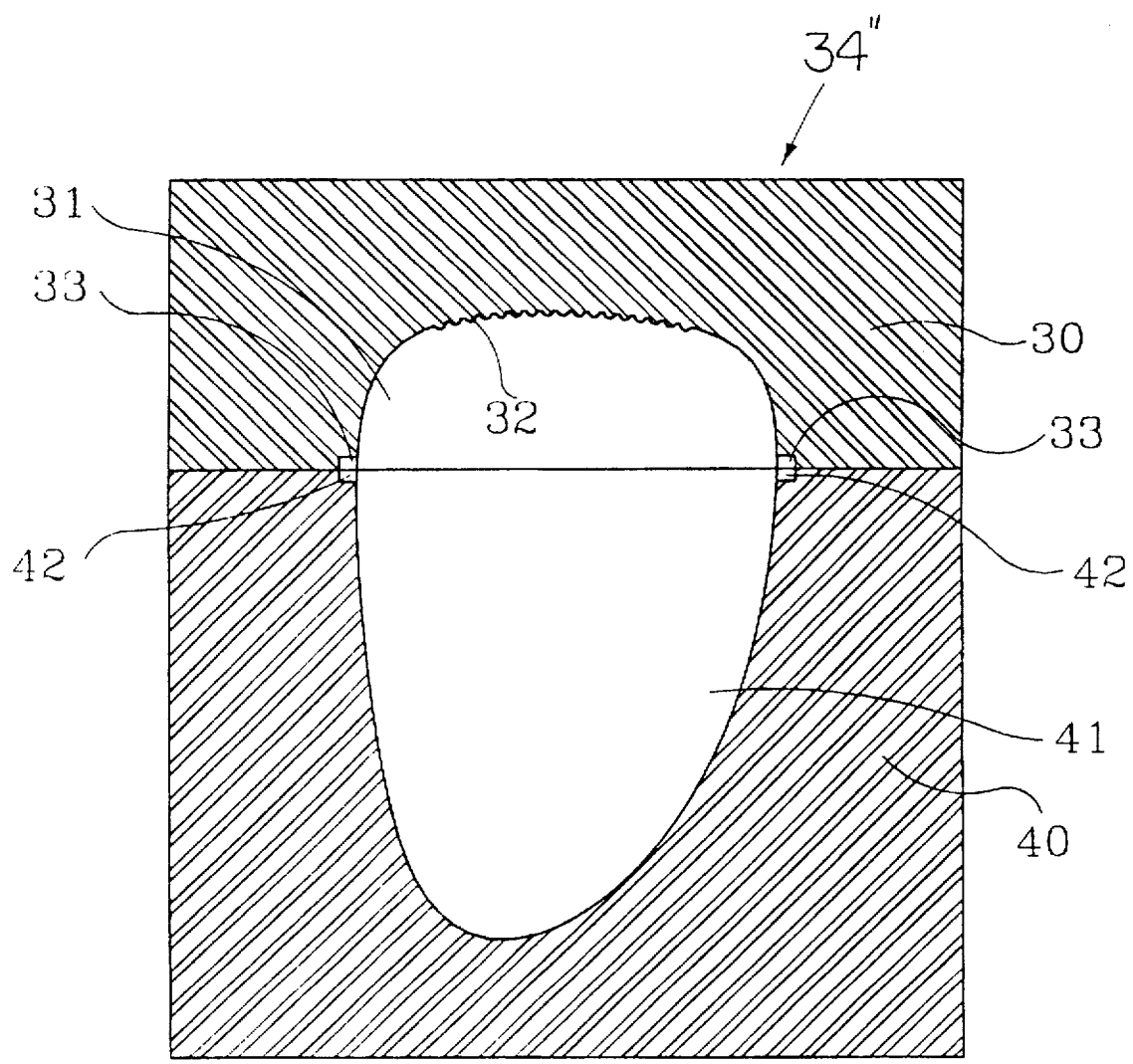
FIG. 5 is a sectional view of a third embodied mold of the above first preferred embodiment according to the present invention.

As shown in FIG. 5, a third embodied precision mold 34" is illustrated which also comprises a first mold 30 and a second mold 40. The first mold 30 and the second mold 40 engage to provide a molding separation line. The first mold 30 has a precision cut out forming a first molding cavity 31, wherein the inner wall of the first mold 30 has a series of scoring lines 32. The second mold 40 has a cut out forming a second molding cavity 41. Two halves of first pin slots 33 are punctured facing one another at a most outer edges of the first molding cavity 31 and another two halves of second pin slots 42 are punctured facing one another at a most outer edges of the second molding cavity 41. Therefore, when the second mold 40 encloses to interlock with the first mold 30, the four halves pin slots 33 and 42 would also be tightly concealed as two complete pin slots 50 respectively.

Figure 7:
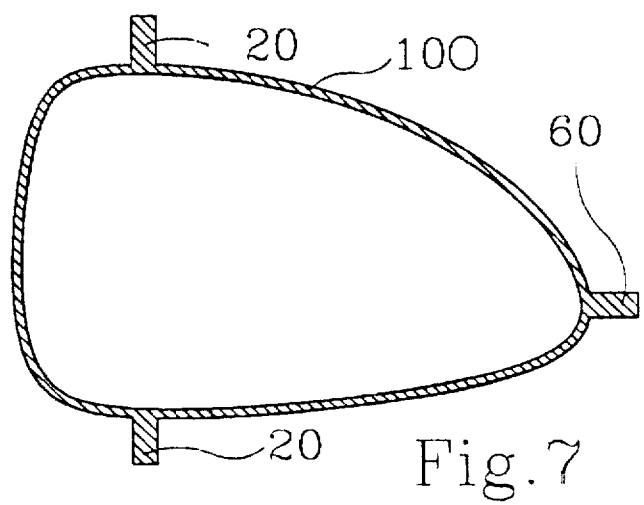
FIG. 7 is a sectional view of an alternative mode of the hollow golf club head frame of the above first preferred embodiment according to the present invention.
Figure 6:
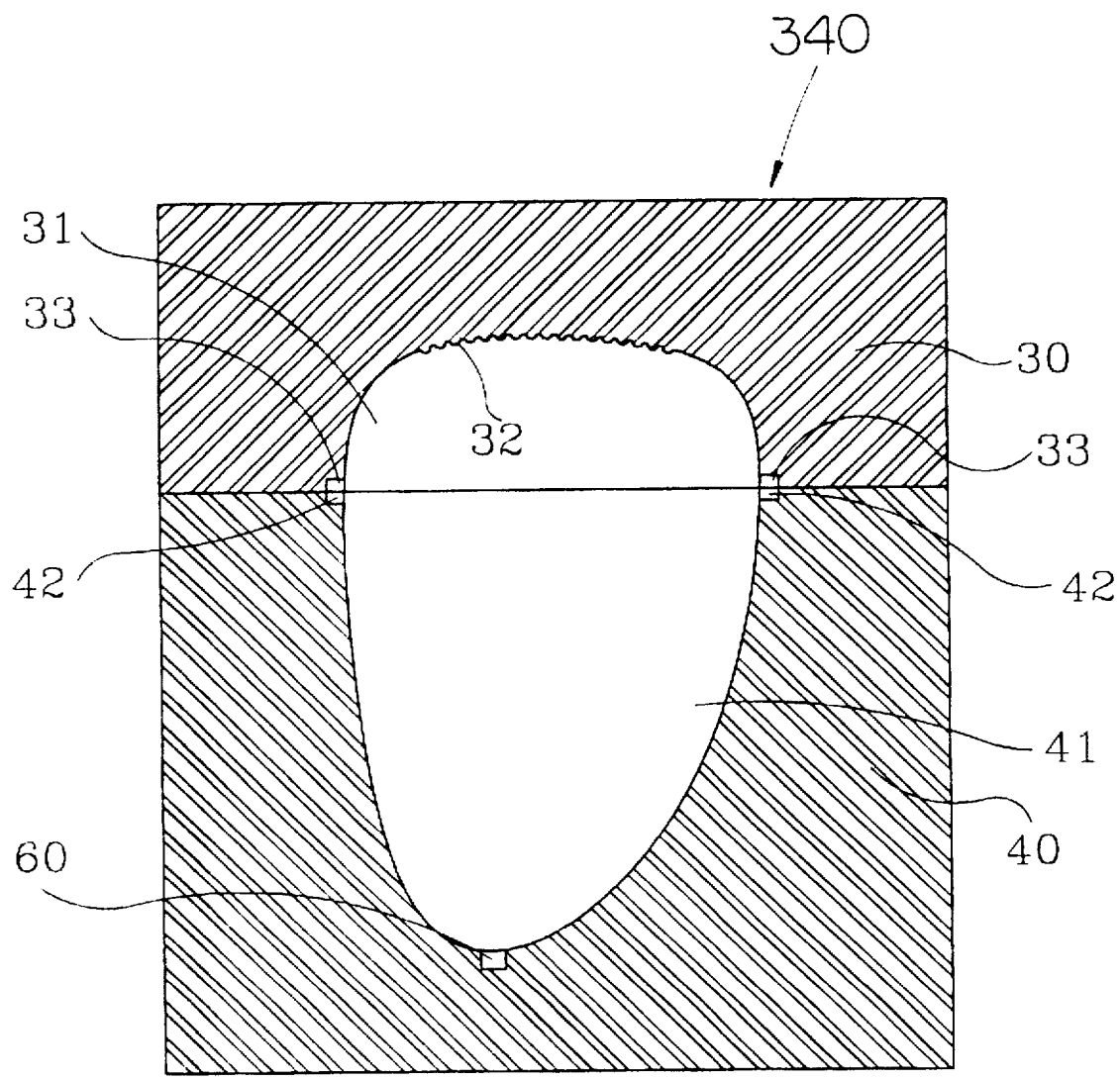
FIG. 6 is a sectional view of a fourth embodied mold of the above first preferred embodiment according to the present invention.

As shown in FIGS. 6 and 7, a fourth embodied precision mold 340 and an alternative mode of the hollow golf club head frame 100 are illustrated respectively. The mold 340 also comprises a first mold 30 and a second mold 40. The first mold 30 and the second mold 40 engage to provide a molding separation line. The first mold 30 has a precision cut out forming a first molding cavity 31, wherein the inner wall of the first mold 30 has a series of scoring lines 32. The second mold 40 has a cut out forming a second molding cavity 41. Besides the two pin slots 50, the second mold 40 further provides a third pin slots 60 at the bottom end of the second molding cavity 41 of the second mold 40. Moreover, the alternative hollow golf club head 100 correspondingly protrudes an additional third supporting pin 80 at a smaller end thereof for fittingly inserting into the respective third pin slot 60 of the second mold 40.

As shown in FIG. 8, a final product of a golf club head manufacturing by the above manufacturing process of the present invention is illustrated. The golf club head comprises the hollow golf club head frame 10 fully concealed all around by the rigid outer shell 70, in which the outer shell 70 is being engaged with the two supporting pins 20 for integrally supporting, and at a top perimeter of the frame 10 having a series of scoring lines 71 set by the first mold 30.

It is worth to mention that the supporting pins 50, 80 are integrally formed on the hollow golf club head frame 10. However, the supporting pins 50, 80 can also be integrally welded, riveted or screwed onto the hollow golf club head frame 10.

The present invention can provide a golf club head with a long life span due to the rigid and durable integral unit structure, having an ability to resist high impact golfing due to the impact vibration resistant hollow center, and also providing a golf club head with much lighter body weight.

What is claimed is:

1. A manufacturing process of a golf club head comprising the steps of:
   (a) constructing a hollow golf club head frame which has an inner cavity therein and at least two opposite supporting pins protruding outwardly from an outer perimeter of said hollow golf club head frame;
   (b) positioning said hollow golf club head frame within a precision mold which has an internal molding cavity, wherein said internal molding cavity of said mold has at least two opposite pin slots to fittingly receive said two respective supporting pins of said hollow golf club head frame, so as to support said hollow golf club head frame concentrically within said mold, for defining an uniform intermediate gap between said outer perimeter of said hollow golf club head frame and an inner wall of said mold;
   (c) filling out said intermediate gap between said mold and said hollow golf club head frame with a melted rigid material in order to form a rigid outer shell to uniformly conceal said hollow golf club head frame, wherein said outer shell is further secured and held in position by said two supporting pins;
   (d) removing said mold after said outer shell and said hollow golf club head frame becomes an integral unit of golf club head, wherein each supporting pin has a residual tail protruded from said outer shell; and
   (e) grinding said two residual tails of said supporting pins to achieve a smooth outermost surface for said golf club head.

2. A manufacturing process of a golf club head as recited in claim 1 in which said rigid material comprises a metal.

3. A manufacturing process of a golf club head as recited in claim 1 in which said rigid material comprises an alloy.

4. A manufacturing process of a golf club head as recited in claim 1 in which said rigid material comprises a plastic material.

5. A manufacturing process of a golf club head as recited in claim 1 in which said mold comprises a first mold and a second mold, said first mold being engaged with said second mold for providing a molding separation line and concealing said pin slots, so that said hollow golf club head frame is securely positioned within said mold by said supporting pins.

6. A manufacturing process of a golf club head as recited in claim 5 in which at an inner wall of said first mold has a series of scoring lines.

7. A manufacturing process and structure of a golf club head as recited in claim 5 in which said first mold and said second mold each has an inner cut out to provide a first and a second molding cavity respectively, wherein said first and second molding cavity combine to form said internal molding cavity when engaging together.

8. A manufacturing process and structure of a golf club head as recited in claim 7 in which said two pin slots being provided at a most outer edge of said first molding cavity of said first mold facing each other on a opposite side.

9. A manufacturing process of a golf club head as recited in claim 7 in which said two pin slots being provided at a most outer edge of said second molding cavity of said second mold facing each other on a opposite side.

10. A manufacturing process a golf club head as recited in claim 7 in which said two pin slots comprises two halves of first pin slots punctured facing one another at a most outer edges of said first molding cavity and another two halves of second pin slots punctured facing one another at a most outer edges of said second molding cavity, so that when said second mold encloses to interlock with said first mold, said four halves pin slots are tightly concealed as said two complete pin slots respectively.

11. A manufacturing process and structure of a golf club head as recited in claim 10 in which said second mold further has a third pin slot positioned at a bottom end of said second mold and said hollow golf club head frame further protrudes a third supporting pin at a smaller end thereof adapted to fittingly insert into said third pin slot.

12. A manufacturing process and structure of a golf club head as recited in claim 1 in which said mold further has a third pin slot positioned at a bottom end of said mold and said hollow golf club head frame further protrudes a third supporting pin therefrom adapted to fittingly insert into said third pin slot.

13. A manufacturing process a golf club head as recited in claim 1 in which said supporting pins are integrally formed on said hollow golf club head frame.

14. A manufacturing process a golf club head as recited in claim 1 in which said supporting pins are integrally welded onto said hollow golf club head frame.

15. A manufacturing process and structure of a golf club head as recited in claim 1 in which said supporting pins are integrally riveted onto said hollow golf club head frame.

16. A manufacturing process and structure of a golf club head as recited in claim 1 in which said supporting pins are integrally screwed onto said hollow center golf club head frame.

* * * * *